United States Patent [19]

Proctor et al.

[11] Patent Number: 5,519,779
[45] Date of Patent: May 21, 1996

[54] METHOD AND APPARATUS FOR INSERTING SIGNALING IN A COMMUNICATION SYSTEM

[75] Inventors: Lee M. Proctor, Cary; James P. Ashley, Naperville, both of Ill.

[73] Assignee: Motorola, Inc., Schaumburg, Ill.

[21] Appl. No.: 286,716

[22] Filed: Aug. 5, 1994

[51] Int. Cl.⁶ .................................................. H04K 1/10
[52] U.S. Cl. ........................ 380/34; 375/205; 395/2.16; 395/2.14
[58] Field of Search .......................... 380/34; 375/205, 375/240; 395/2.16, 2.14; 381/29, 30

[56] References Cited

U.S. PATENT DOCUMENTS

| | | | |
|---|---|---|---|
| 4,641,303 | 2/1987 | Vogl | 375/240 X |
| 4,852,179 | 7/1989 | Fette | 381/29 |
| 5,179,594 | 1/1993 | Yip et al. | 381/30 X |
| 5,329,547 | 7/1994 | Ling | 375/1 |
| 5,404,377 | 4/1995 | Moses | 375/1 |

OTHER PUBLICATIONS

Viswanathan, R. et al.; "The Application of a Functional Perceptual Model of Speech to Variable–Rate LPC System"; IEEE Conference Record, 1977, Acoustics, Speech, Signal Proce.; pp. 219–222.

Gold; "Multiple Rate Channel Vocoding"; Eascon 1978 Conference, Arlington, VA, pp. 25–27 Sep. 1978.

*Primary Examiner*—David C. Cain
*Attorney, Agent, or Firm*—Raymond J. Warren

[57] ABSTRACT

Signaling is inserted (102) into a communication channel of a communication system by inserting the signaling into the communication channel if the communication channel has sufficient available bandwidth (104). If the communication channel does not have sufficient available bandwidth, reducing the bandwidth of information being communicated on the communication channel (106) and inserting the signaling into the communication channel (108) with reduced information bandwidth.

41 Claims, 3 Drawing Sheets

METHOD AND APPARATUS FOR INSERTING SIGNALING IN A COMMUNICATION SYSTEM

FIELD OF THE INVENTION

The present invention relates generally to communication systems, and more particularly, to a method and apparatus for inserting signaling into a communication channel of a communication system.

BACKGROUND OF THE INVENTION

Communication systems, and particularly cellular communication systems, are well known. Cellular communication systems, as are known, consist of individual cell sites, each equipped to communicate with mobile communication units operating within the cell site. Communication in a cell site is conducted over a communication resource, commonly referred to as a communication channel, which may consist of a pair of radio frequencies used by the mobile communication unit to transmit and receive information with the cell site. More recently, digital cellular communication systems have been developed in which the communication channel consists of a series of time slots or packets that contain frames of information communicated between the mobile communication unit and the base station. These digital communication systems have greatly enhanced the capacity of the communication system as multiple users may be allocated to a single communication channel by multiplexing the frames of information onto the communication channel.

In digital communication systems, and for example a digital cellular communication system, a speaker's voice is first converted to a modulated signal. This modulated signal is then encoded, i.e., transformed from the modulated signal to a digital representation of the modulated signal which is suitable for transmission on the communication channel. The encoded signal is transmitted to a receiving unit, e.g., a mobile communication unit, where it is decoded, demodulated and reproduced as an audio representation of the speaker's voice.

In order to control the communication activity within the cellular communication system, control information or signaling, is communicated between the mobile communication units and the base station controller at the cell site. In, for example, a time division multiple access (TDMA) system, a particular time slot of the information frame can be dedicated to carrying the signaling information. This arrangement, however, can prove to be inefficient in that the time slot is always reserved for signaling even when signaling is not required. By reserving this time slot, the available bandwidth for carrying information, such as encoded speech, is reduced.

In code division multiple access (CDMA) type communication systems, no particular portion of the information frame is reserved for signaling. Each information frame is therefore efficiently used to carry a maximum amount of information if required. It is also known in CDMA systems to provide variable rate communication. Variable rate communication provides, in some instances, for less than the full information frame to be used to communicate a particular user's information. The remaining portion of the information frame is thus available to service other users, or, as will be described, to communicate signaling.

With variable rate communication, when a user is speaking the information is typically communicated at full-rate. That is, the entire information frame is dedicated to carrying the user's encoded speech. However, during pauses in speech, full-rate communication is not required to effectively communicate all of the speaker's information, and hence, lower rates such as half (½) rate, quarter (¼) rate or eighth (⅛) rate are used. In half-rate, the user's information fills only ½ of the information frame or information bandwidth. Information from another user of the system can therefore be inserted into the frame, or the remaining portion of the information bandwidth, and communicated over the communication channel.

When signaling is required, i.e., signaling between, for example, the mobile communication unit and the base station, or vice versa, the signaling device will attempt to wait for a less than full-rate communication frame into which to insert the signaling information. However, the signaling information typically includes a "time-out" or time period in which it must be sent. In the event that the time-out is reached without the signaling information being sent, the signaling device will insert the information in what is known as either a "blank-and-burst" or "dim-and-burst" process.

During a blank-and-burst, an entire frame or more of encoded speech is discarded and the signaling information is inserted in place of the encoded speech. In a dim-and-burst, the speech is encoded at less than full-rate, such as ½ rate, and the signaling information is inserted in with the frame with reduced information bandwidth. During blank-and-burst or dim-and-burst operations, a portion of the encoded speech is lost as signaling is transmitted in its place resulting in some audio disruption. Before conducting a blank-and-burst or dim-and-burst, however, the speech encoder at the signaling device adjusts its state accordingly so that the receiving device decoder does not significantly diverge as a result of the lost speech bandwidth and audio quality is substantially maintained.

In a mobile-to-mobile communication, the speech is encoded at the transmitting mobile communication unit, communicated through the cellular communication network and received by the receiving mobile where it is decoded. While being communicated through the cellular communication network, the speech is not decoded, but it is merely communicated to its destination. If, however, the cellular communication network has to transmit signaling information to the receiving mobile, the only way to do so is by conducting a blank-and-burst. This can lead to excessive divergence between the encoder at the transmitting mobile and the decoder at the receiving mobile communication unit. As discussed, when inserting signaling information, the signaling device encoder is normally allowed to adjust its state such that divergence between the decoder and the encoder is avoided. However, when the signaling information is inserted by the cellular network equipment in a mobile-to-mobile communication, the cellular network can not inform the speech encoder of the mobile communication unit to adjust its state. The decoder, anticipating frames containing encoded speech diverges from the encoder causing a reduction in the audio quality.

Disruptions of the frames during communication is not uncommon and the decoder is adapted to treat the loss of speech frames (known as frame erasures) due to corruption. To account for insertion of signaling by the cellular communication network in a mobile-to-mobile communication, it has been proposed to allow the decoder to simply consider the blank-and-burst signaling frames as frame erasures such as if the frame were corrupted during transmission. Such a method suffers a number of disadvantages. During initial call set-up of a mobile-to-mobile communication significant additional signaling and processing is required. During this processing it is also required that the audio signal be muted for up to one second so that all of the required call set-up signaling may be communicated to the mobile communication units, which includes informing the mobile communication units that the call is a mobile-to-mobile call. The mobile communication units then consider blank-and-burst signals as frame erasures during that particular call. Testing, however, reveals that with this method there is only marginal improvement in audio quality as compared to making no accommodation for the blank-and-burst frames.

Therefore, there is a need for enhancing audio quality during signaling insertion in a cellular communication system, and particularly, in the mobile-to-mobile communication scenario.

DETAILED DESCRIPTION OF THE PREFERRED EMBODIMENTS

In accordance with a preferred embodiment of the present invention, audio quality in a mobile-to-mobile communication is enhanced during signaling insertion through a strategy of reducing the traffic frame rate, i.e., the information bandwidth, to insert signaling in a dim-and-burst format while retaining a partial description of the encoded speech. It is described as follows in terms of a mobile-to-mobile communication in a CDMA cellular communication system. One of ordinary skill in the art, however, will appreciate that the present invention has numerous other applications including, for example, enhancing audio quality of stored message retrieval systems.

Figure 1:
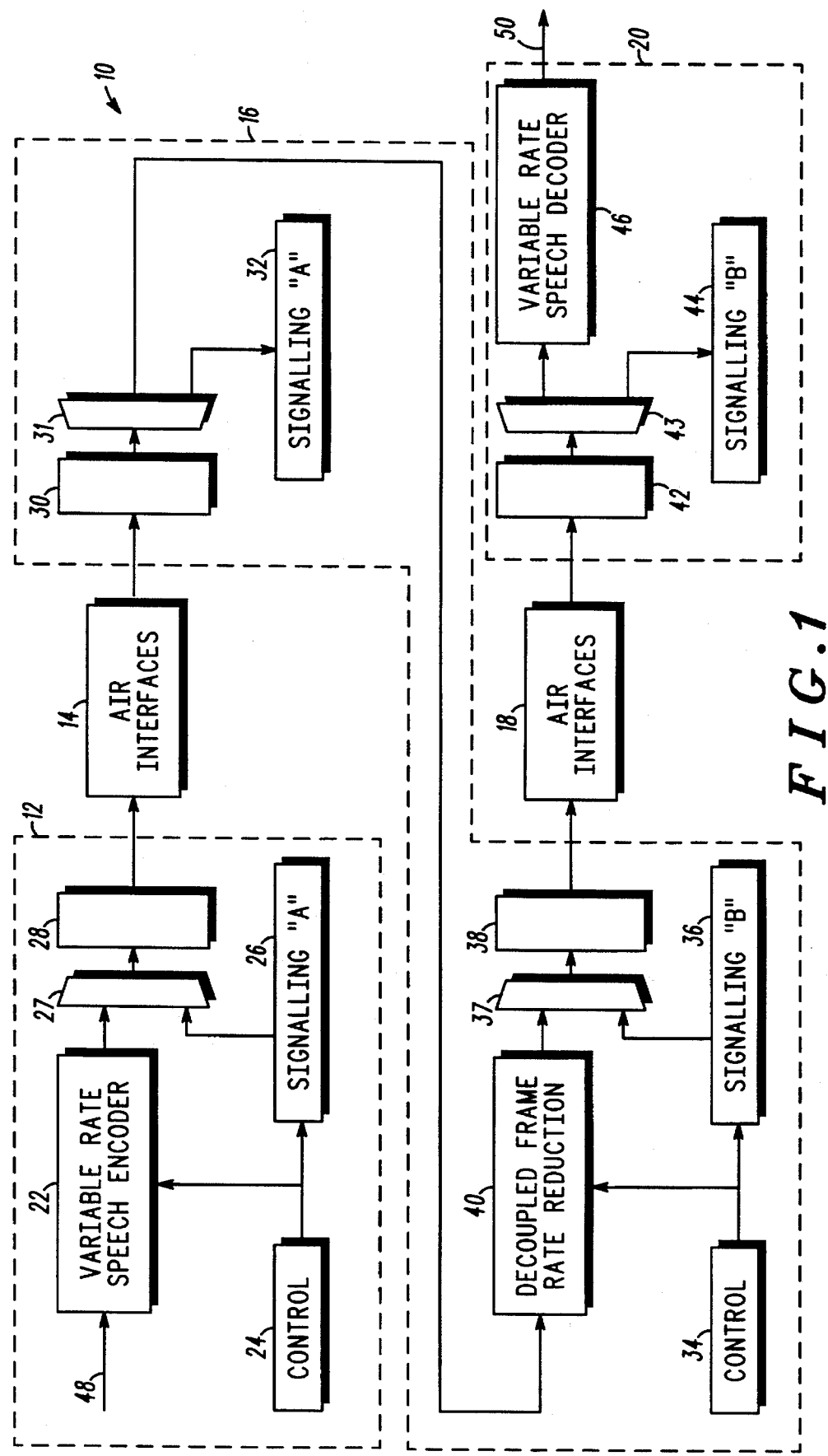
FIG. 1 is a block diagram of a portion of a typical cellular communication system in accordance with a preferred embodiment of the present invention.

With reference to FIG. 1 a portion of a cellular communication system 10 is shown and includes a first mobile communication unit 12, a first air interface 14, a base station 16, a second air interface 18 and a second mobile communication unit 20. As is known in the CDMA cellular communication system art, mobile communication unit 12 includes a variable rate speech encoder 22, a controller 24, a signal processor 26, a multiplexor 27 and a transmitter 28 for transmitting encoded speech and/or signaling over air interface 14. Air interfaces 14 and 18, in the preferred embodiment, are typical spread spectrum communication channels. Base station 16 includes a receiver 30 for receiving the transmitted encoded speech and/or signaling, a de-multiplexor 31, a signal processor 32 for receiving transmitted signaling, a controller 34, a signal processor 36 for generating signaling, a multiplexor 37 and a transmitter 38 for transmitting encoded audio and/or signaling over air interface 18. Base station 16 also includes a variable rate frame reducer 40 for reducing higher rate encoded speech to lower rate encoded speech, i.e., for reducing the information bandwidth, as will be described. Mobile communication unit 20 includes a receiver 42 for receiving encoded audio and/or signaling, a de-multiplexor 43, a signal processor 44 for receiving transmitted signaling and a variable rate speech decoder 46. It should be understood that the elements of mobile communication units 12 and 20 are identified individually for clarity, and that each mobile communication unit would contain the elements of the other. Moreover, the elements, for example, transmitter 28 and receiver 42, multiplexor 27 and de-multiplexor 43, or signal processor 26 and signal processor 44 could be combined into single elements, respectively, without departing from the fair scope of the present invention. Similarly, elements of base station 16 such as signal processor 32 and signal processor 36 or transmitter 38 and receiver 30 could be combined into single elements, respectively.

In operation, modulated speech 48 is communicated to variable rate speech encoder 22 within mobile communication unit 12. Variable rate speech encoder 22 encodes the speech and generates an encoded speech packet to be included into a traffic frame. Traffic frames, as defined for CDMA communication systems (IS-96, available from Electronics Industries Association/Telecommunications Industries Association, Engineering Publications Office, 2001 Pennsylvania Ave., Washington, D.C. 20006) are 20 milliseconds (ms) in length. Depending on the rate at which the speech is encoded, i.e., full-rate, half-rate, etc., the encoded speech packet may occupy substantially all of the traffic frame, or some fraction thereof. The encoded speech packet is inserted into the traffic frame and multiplexor 29 multiplexes the traffic frame for transmission over air interface 14 to the receiver 30 of base station 16.

Base station 16, ordinarily passes the traffic frame through, with transmitter 38 simply retransmitting the traffic frame over air interface 18 to the receiver 42 of mobile communication unit 20. In mobile communication unit 20, the received signal is de-multiplexed by de-multiplexor 43 and variable rate speech decoder 46 decodes the encoded speech into a modulated format 50 which is then demodulated and reproduced as an audio signal.

During communication between mobile communication unit 12 and mobile communication unit 20, mobile communication unit 12 may have to transmit signaling to base station 16. In this case, controller 24 informs variable rate speech encoder 22 that signaling is being inserted. The signaling is inserted into the traffic frames by signal processor 26 and are transmitted to receiver 30 of base station 16. At base station 16, the signaling is extracted from the traffic frames by signal processor 32. The foregoing is easily accomplished in either blank-and-burst format, where signaling is substituted for the entire traffic frame, or dim-and-burst format, where the signaling occupies some fraction of the traffic frame, because the controller 24 can provide information to the variable rate speech encoder 22 prior to inserting the signaling so that variable rate speech encoder 22 may adjust it state accordingly.

When base station 16 has to transmit signaling to mobile communication unit 20, however, base station 16 can not inform variable rate speech encoder 22 of the impending signaling insertion. Therefore, variable rate speech encoder 22 can not adjust its state prior to sending encoded speech. During insertion of signaling by base station 16 into the traffic frames, encoded speech frames transmitted from communication unit 12 are discarded. This results in divergence between variable rate speech encoder 22 and variable rate speech decoder 46, which was anticipating encoded speech frames, and hence, results in reduced audio quality. According to a preferred embodiment of the present invention, base station 16 is operable, through frame rate reducer 40, to adjust the traffic frame rate prior to inserting signaling. That is, frame rate reducer 40 reduces the information bandwidth of the transmitted signal to create sufficient bandwidth to communicate the signaling, while preserving a portion of the information bandwidth, e.g., encoded speech, and thereby enhancing audio quality by reducing encoder/decoder divergence.

Figure 2:
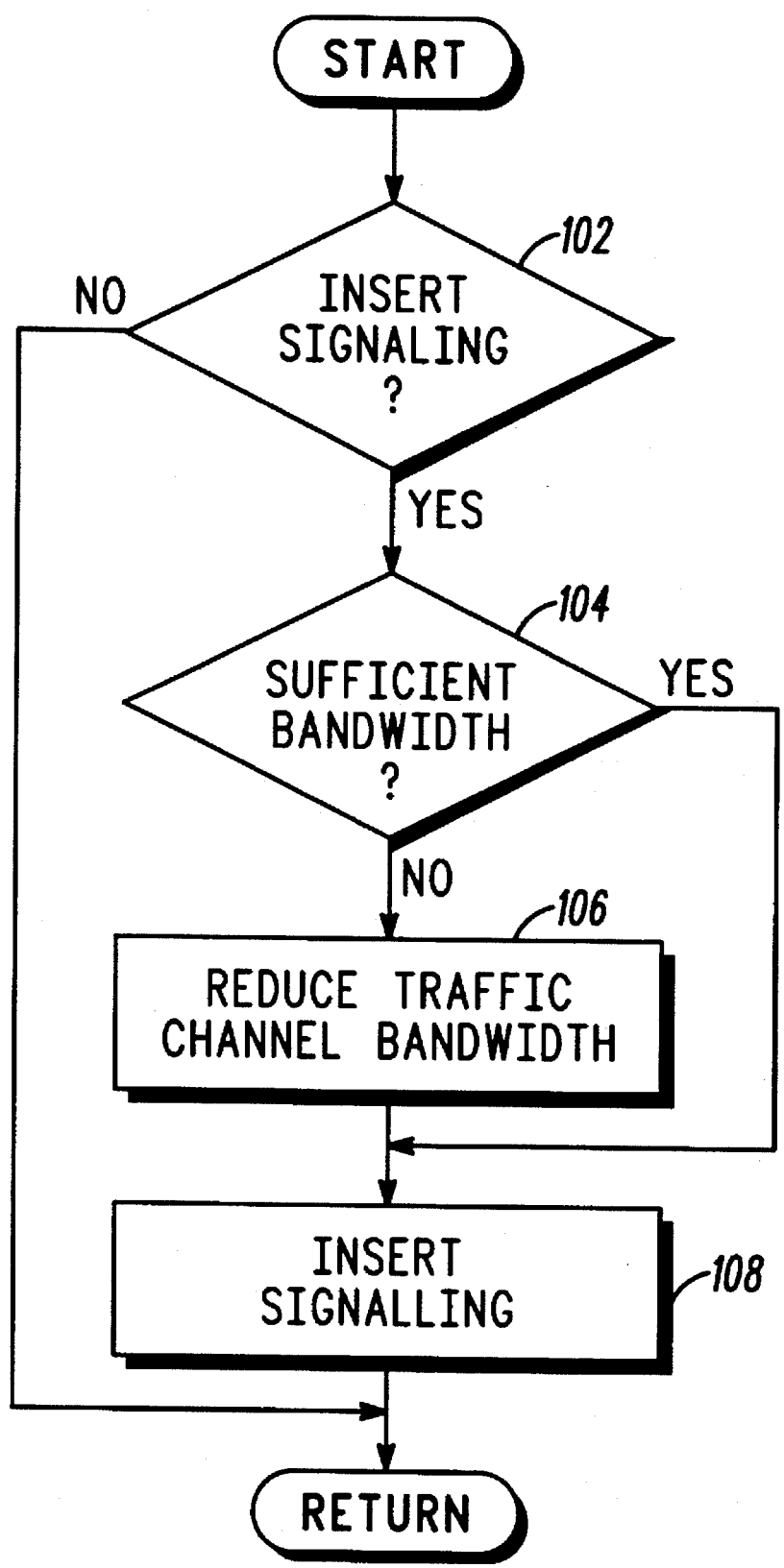
FIG. 2 is a flowchart illustrating a method of enhancing audio quality in a mobile-to-mobile cellular communication in accordance with a preferred embodiment of the present invention.
Figure 3:
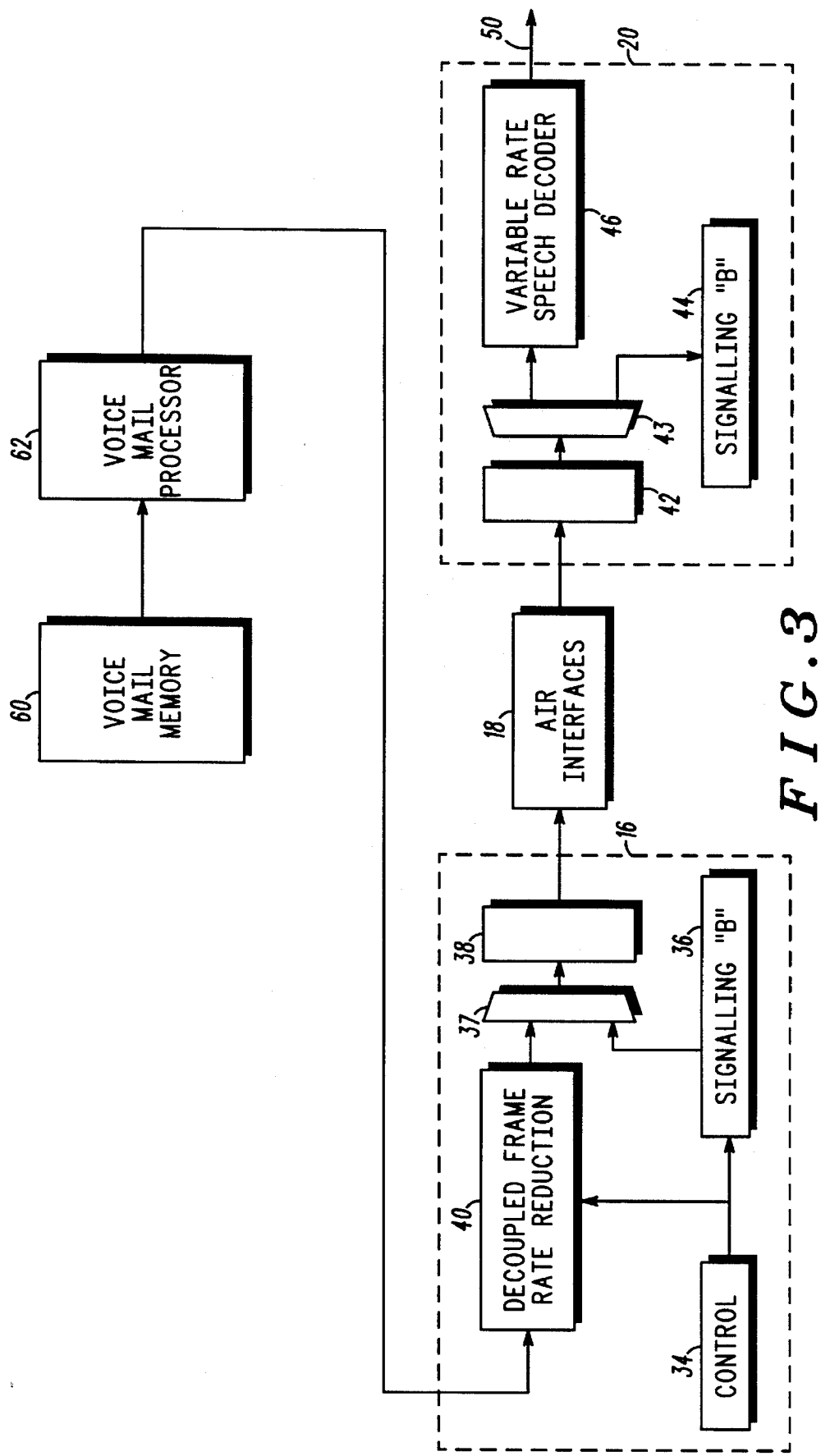
FIG. 3 is a block diagram of a digital message retrieval system having enhanced audio quality in accordance with a preferred embodiment of the present invention.

With continued reference to FIG. 1 and further reference to FIG. 2, base station 16 acts to receive and retransmit the traffic frames when there is no signaling to be sent 102. Where there is signaling to be sent, controller 34 informs frame rate reducer 40 and signal processor 36. Frame rate reducer 40 determines if there is sufficient information bandwidth available in the traffic frame to insert the signaling 104. That is, if the signaling can be transmitted at half-rate and the traffic frames are presently being transmitted at half-rate, frame rate reducer 40 does nothing to the traffic frames and the signaling is inserted into the traffic frames by signal processor 36 at half-rate 106. If, however, there is not sufficient information bandwidth available in the traffic frames 104, frame rate reducer 40 reduces the information bandwidth of the traffic frames 108 by mapping the encoded speech parameters from a first, higher frame rate to a second, lower frame rate as will be described. The reduced rate traffic frames retain at least a partial description of the encoded speech which reduces divergence between the variable rate encoder 22 and variable rate decoder 46. In general, the reduced rate traffic frames have enough bandwidth to insert the signaling which signal processor 36 does at an appropriate rate 106. That is, if the traffic frames are reduced from full-rate to half-rate, signaling is inserted at half-rate.

As defined in the IS-96 Specification for the code excited linear prediction (CELP) variable rate vocoder (voice encoder), variable rate encoder 22, transforms the speech into a number of encoding parameters. These parameters are: line spectrum pairs (LSP), pitch lag (Plag), pitch gain (Pgain), codebook index (CBindex) and codebook gain (CBgain) which represent the speech in a digitally encoded format. A complete description of the encoding parameters may be obtained from the Appendix A of IS-96. It should be understood however that other encoding methods may be employed without departing from the fair scope of the present invention. Depending on whether the speech was encoded at full, half or some other rate, the encoding parameters differ as illustrated in the following Table 1.

TABLE 1

|  | FULL RATE | HALF RATE | QUARTER RATE | EIGHTH RATE |
| --- | --- | --- | --- | --- |
| LSP analysis frame size | 160 | 160 | 160 | 160 |
| LSPs per frame | 10 × 4 | 10 × 2 | 10 | 10 |
| Pitch Subframes per frame | 4 | 2 | 1 | 0 |
| Pitch Subframe size (samples) | 40 | 80 | 160 | — |
| Codebook Subframes per frame | 8 | 4 | 2 | 1 |
| Codebook Subframe size (samples) | 20 | 40 | 80 | 160 |

Frame rate reducer 40 operates to map a higher rate encoded speech packet to a lower rate encoded speech packet to create bandwidth in the traffic frames for insertion of signaling. In a preferred embodiment of the present invention, the LSPs are re-quantized from full-rate to half-rate. This can be expressed as:

$$LSP_h(i) = Q_{hi}\{Q_{fi}^{-1}\{LSP_f(i)\}\}; \ i=1,\ldots,10 \quad (1)$$

where $Q_{hi}$ is a half-rate quantization operator for the half rate line spectrum pair ($LSP_h(i)$) and $Q_{fi}^{-1}$ is an inverse full-rate quantization operator for the full rate line spectrum pair ($LSP_f(i)$). The LSPs are the only parameters decimated in resolution, i.e., the LSP parameters are transmitted at the same rate with lower resolution. The remaining parameters are decimated in time, i.e., the same resolution is transmitted half as often to represent the same amount of audio data. Therefore, the parameters for two successive subframes are combined into one subframe by some function which minimizes the total error. For the pitch gain, the function F can be generalized for half-rate subframe i as:

$$P_h\text{gain}(i) = F(P_f\text{gain}(2i-1), P_f\text{gain}(2i)); \ i=1,2. \quad (2)$$

In the preferred embodiment, the mean of the full-rate pitch gain is used to produce the half-rate pitch gain, or:

$$P_h\text{gain}(i) = \frac{P_f\text{gain}(2i-1) + P_f\text{gain}(2i)}{2}; \ i=1,2. \quad (3)$$

Similarly, the function F for the pitch lag can be generalized $$P_h\text{lag}(i) = F(P_f\text{lag}(2i-1), P_f\text{lag}(2i)); \ i=1,2. \quad (4)$$

Again, in the preferred embodiment, the mean of the full-rate pitch lag is used to produce the half-rate pitch lag, or:

$$P_h\text{lag}(i) = \frac{P_f\text{lag}(2i-1) + P_f\text{lag}(2i)}{2}; \ i=1,2. \quad (5)$$

For the codebook index, each of four half-rate subframes can be expressed as a function of two of the eight full-rate subframes, or:

$$CB_h\text{index}(i) = F(CB_f\text{index}(2i-1), CB_f\text{index}(2i)); \ i=1,\ldots,4. \quad (6)$$

In the optimal case, the function F concatenates the two full-rate codebook vectors and chooses a new index based upon the minimum squared error between the concatenated full-rate vectors and a single half-rate vector, where all half-rate vector indices are exhausted. Another, less computationally intensive approach, is to choose the full-rate index corresponding to the highest codebook gain. If a second index is chosen, the index needs to be adjusted so that the second half of the half-rate code vector is aligned with the second full-rate code vector. However, these methods provide only a marginal improvement over simply using the index of the first full-rate code vector. Therefore, the codebook index may be expressed as:

$$CB_h\text{index}(i) = CB_f\text{index}(2i-1); \ i=1,\ldots,4. \quad (7)$$

The codebook gain can also be expressed as a function of two of the eight full-rate subframes as shown:

$$CB_h\text{gain}(i) = F(CB_f\text{gain}(2i-1), CB_f\text{gain}(2i)); \ i=1,\ldots,4. \quad (8)$$

These parameters require requantization, combination and requantization for a composite half-rate codebook gain. Since the codebook gain is differentially encoded, the inverse quantized values are added, not averaged, to yield a net differential gain. The constant k is subtracted to provide a leakage term that is applied during the decoding process to minimize divergence of the codebook gain. Hence, the half-rate codebook gain can be expressed as:

$$CB_h\text{gain}(i) = Q_h\{Q_f^{-1}\{CB_f\text{gain}(2li-1)\} + Q_f^{-1}\{CB_f\text{gain}(2li-1)\} - k\}; \ i=1,\ldots,4. \quad (9)$$

These equations only consider combining the last two subframe parameters. It may be desirable to have a history of previous subframes. However, doing so complicates that algorithm and introduces considerably more processing into the base station multiplexor function. The equations utilized in the preferred embodiment can be quickly calculated without significant processing burden or increase in the system delay.

Table II illustrates an objective measure of a simulated performance of cellular communication system incorporating the present invention. The Segmental Signal-to-Noise Ratio (SNRseg) reported in Table II is defined as:

$$SNR_{seg} = \frac{1}{M} \sum_{j=0}^{M-1} 10\log_{10} \left[ \frac{\sum_{i=jN}^{jN+N-1} x^2(i)}{\sum_{i=jN}^{jN+N-1} (x(i)-y(i))^2} \right] \quad (10)$$

and the Power Spectral Signal-to-Noise Ratio(SNRps) is defined as:

$$SNR_{ps} = \frac{1}{M} \sum_{j=0}^{M-1} 10\log_{10} \left[ \frac{\sum_{i=0}^{L-1} |X_{jN}(i)|^2}{\sum_{i=0}^{L-1} [|X_{jN}(i)| - |Y_{jN}(i)|]^2} \right] \quad (11)$$

where x(n) is the output of the reference speech decoder, y(n) is the output of the test speech decoder, $|X_i(k)|$ is the 256 point discrete fourier transform (DFT) magnitude spectrum of signal x(n) starting at time i, $|Y_i(k)|$ is the 256 point DFT magnitude spectrum of signal y(n) starting at time i, N is the segment size in samples (40), M is the number of segments in the sequence x(n), L is the number of unique DFT magnitude elements (in the preferred embodiment, 129).

Table II presents results from a test wherein the signaling rate is set at one (1) per twenty traffic frames. The inputs are IS-85 standard test files as indicated. The first column reports the results for a blank-and-burst system, the second column reports the results for the frame erasure compensation system, the third column reports the results of the frame rate reducer of the present invention. As can be see, the present invention provides significantly improved SNR measured over the blank-and-burst or frame erasure methods. Subjective testing also indicates improved audio quality with the present invention.

TABLE II

| IS-95 | SIGNALING RATE - 1 PER 20 FRAME | | | | | |
|---|---|---|---|---|---|---|
| | BLANK AND BURST | | ERASURE | | DIM-AND-BURST | |
| FILE | SNRseg | SNRps | SNRseg | SNRps | SNRseg | SNRps |
| F160 | 7.4 dB | 11.3 dB | 6.9 dB | 10.5 dB | 12.2 dB | 15.5 dB |
| F520 | 5.8 dB | 10.0 dB | 5.7 dB | 9.7 dB | 12.7 dB | 16.6 dB |
| M120 | 4.7 dB | 8.9 dB | 4.9 dB | 9.0 dB | 10.7 dB | 14.5 dB |
| M540 | 6.5 dB | 11.0 dB | 6.8 dB | 11.2 dB | 12.9 dB | 16.3 dB |
| Average | 6.1 dB | 10.3 dB | 6.1 dB | 10.1 dB | 12.1 dB | 15.7 dB |

The present invention has been described in terms of a preferred embodiment directed to a CDMA cellular communication system with mobile-to-mobile communication. One skilled in the art will readily appreciated that its teachings may be otherwise embodied without departing from its fair scope. For example, the present invention may be applied where an audio message, such as identifying tones, recorded messages or voice mail messages, are stored in an encoded format and later communicated to a mobile communication unit. As an illustration of such an application, in a voice mail system, such as shown in FIG. 4, the audio voice mail messages are stored in voice mail system memory 60 in encoded speech format. Like reference numerals are used to identify like elements from the preceding embodiment. If the voice mailbox owner is retrieving messages via a mobile communication unit 20, the voice mail processor 62 retrieves the message and communicates it to base station 16 still in encoded format. If base station 16 has to insert signaling while communicating the retrieved message to mobile communication unit 20, introduction of the signaling in a blank-and-burst format can cause divergence between the encoded speech and the variable rate decoder 46, and hence, result in reduced audio quality as previously described. To prevent such audio quality reduction, the frame rate reducer 40 of the present invention may be utilized to reduce the rate of the retrieved encoded message to preserve a partial representation of the message during insertion of signaling.

Therefore, the present invention provides for enhanced audio quality by limiting encoder/decoder divergence. This is accomplished by reducing the encoded speech rate to create bandwidth in the traffic frame in which to insert signaling while preserving a partial representation of the encoded speech packet thereby reducing encoder/decoder divergence. Furthermore, the present invention provides enhanced audio quality without significantly increasing processing burden or delay in the cellular communication system.

We claim:

1. An apparatus for inserting signaling into a communication channel of a communication system comprising:

a receiver for receiving a transmitted signal encoded at a first rate;

a frame rate reducer for converting the transmitted signal encoded at a first rate to a signal encoded at a second rate, said second rate being slower than said first rate; and a signal processor for inserting signaling into the signal encoded at the second rate.

2. The apparatus of claim 1 wherein the communication system comprises a CDMA communication system.

3. The apparatus of claim 1 wherein the frame rate reducer is operable to map a set of encoding parameters associated with the transmitted signal encoded at the first rate to a set of encoding parameters associated with the signal encoded at the second rate.

4. The apparatus of claim 3 wherein the frame rate reducer is operable to decimate at least one encoding parameter of the set of encoding parameters in resolution.

5. The apparatus of claim 4 wherein the at least one encoding parameter comprises a line spectrum pair parameter.

6. The apparatus of claim 3 wherein the frame rate reducer is operable to decimate at least one encoding parameter of the set of encoding parameters in time.

7. The apparatus of claim 6 wherein the at least one encoding parameter comprises a pitch gain parameter.

8. The apparatus of claim 6 wherein the at least one encoding parameter comprises a pitch lag parameter.

9. The appartus of claim 6 wherein the at least one encoding parameter comprises a codebook index parameter.

10. The apparatus of claim 6 wherein the at least one encoding parameter comprises a codebook gain parameter.

11. The apparatus of claim 1 wherein the frame rate reducer is operable to preserve a portion of the transmitted signal encoded at a first rate.

12. The apparatus of claim 1 wherein the transmitted signal encoded at a first rate comprises a stored encoded audio signal.

13. The apparatus of claim 1 wherein the transmitted encoded signal encoded at a first rate comprises an encoded audio signal generated by a mobile communication unit.

14. The apparatus of claim 1 wherein the signal encoded at a second rate is communicated to a mobile communication unit.

15. The apparatus of claim 1 wherein the signal encoded at a second rate is communicated to a storage medium.

16. A method of inserting signaling into a communication channel comprising the steps of:
   a) inserting signaling into the communication channel if the communication channel has sufficient available information bandwidth;
   b) reducing information bandwidth of the communication channel if the communication channel lacks sufficient information bandwidth to insert the signaling; and
   c) inserting the signaling into the communication channel with reduced information bandwidth.

17. The method of claim 16 wherein the step of reducing information bandwidth comprises mapping a set of encoding parameters associated with a higher information bandwidth to a set of encoding parameters associated with a lower information bandwidth.

18. The method of claim 17 wherein the step of reducing information bandwidth comprises decimating at least one encoding parameter of the set of encoding parameters in resolution.

19. The method of claim 17 wherein the step of reducing information bandwidth comprises decimating at least one encoding parameter of the set of encoding parameters in time.

20. The method of claim 16 wherein the set of encoding parameters comprise CDMA encoding parameters.

21. The method of claim 16 wherein the step of reducing information bandwidth further comprises preserving a portion of the information bandwidth.

22. The method of claim 16 wherein the information bandwidth comprises a stored encoded audio signal.

23. The method of claim 16 wherein the information bandwidth comprises encoded audio signals generated by a mobile communication unit.

24. The method of claim 16 wherein the reduced information bandwidth and inserted signaling are further communicated to a mobile communication unit.

25. The method of claim 16 wherein the reduced information bandwidth and inserted signaling are further communicated to a storage medium.

26. An apparatus for inserting signaling into a communication channel comprising:
   a) means for inserting signaling into the communication channel if the communication channel has sufficient available information bandwidth;
   b) means for reducing information bandwidth of the communication channel if the communication channel lacks sufficient information bandwidth to insert the signaling; and
   c) means for inserting the signaling into the communication channel with reduced information bandwidth.

27. The apparatus of claim 26 wherein the means for reducing information bandwidth is operable for mapping a set of encoding parameters associated with a higher information bandwidth to a set of encoding parameters associated with a lower information bandwidth.

28. The apparatus of claim 27 wherein the means for reducing information bandwidth is operable for decimating at least one encoding parameter of the set of encoding parameters in resolution.

29. The apparatus of claim 28 wherein the at least one encoding parameter comprises a line spectrum pair parameter.

30. The apparatus of claim 27 wherein the means for reducing information bandwidth comprises decimating at least one encoding parameter of the set of encoding parameters in time.

31. The apparatus of claim 30 wherein the at least one encoding parameter comprises a pitch gain parameter.

32. The apparatus of claim 30 wherein the at least one encoding parameter comprises a pitch lag parameter.

33. The appartus of claim 30 wherein the at least one encoding parameter comprises a codebook index parameter.

34. The apparatus of claim 30 wherein the at least one encoding parameter comprises a codebook gain parameter.

35. The apparatus of claim 26 wherein the set of encoding parameters comprise CDMA encoding parameters.

36. The apparatus of claim 26 wherein the means for reducing information bandwidth is further operable for preserving a portion of the information bandwidth.

37. The apparatus of claim 26 wherein the information bandwidth comprises a stored encoded audio signal.

38. The apparatus of claim 26 wherein the information bandwidth comprises encoded audio signals generated by a mobile communication unit.

39. The apparatus of claim 26 wherein the reduced information bandwidth and inserted signaling are further communicated to a mobile communication unit.

40. The apparatus of claim 26 wherein the reduced information bandwidth and inserted signaling are further communicated to a storage medium.

41. An apparatus for inserting signaling into a communication channel of a communication system comprising:
   a receiver for receiving a transmitted signal encoded at a first rate;
   a frame rate reducer for converting the transmitted signal encoded at a first rate to a signal encoded at a second rate, said frame rate reducer further being operable to map a set of encoding parameters associated with the transmitted signal encoded at the first rate to a set of encoding parameters associated with the signal encoded at the second rate; and
   a signal processor for inserting signaling into the signal encoded at a second rate.

* * * * *